United States Patent [19]
Watanabe et al.

[11] 3,766,369

[45] Oct. 16, 1973

[54] SYSTEM FOR PRODUCING A THREE DIMENSION SURFACE

[75] Inventors: Yasuo Watanabe, Nagoya; Hiroaki Aseno, Chiryu; Kunihiko Eto, Kariya, all of Japan

[73] Assignee: Toyoda Koki Kabushiki Kaisha, Kariya-shi, Aichi-ken, Japan

[22] Filed: Feb. 3, 1972

[21] Appl. No.: 222,937

[30] Foreign Application Priority Data
Feb. 3, 1971 Japan.................................. 46/4423

[52] U.S. Cl............. 235/151.11, 235/152, 318/570, 318/573
[51] Int. Cl...................... G06f 15/46, G05b 19/18
[58] Field of Search........................ 235/151.11, 152; 318/570–574; 90/11 C, 13 C

[56] References Cited
UNITED STATES PATENTS

| | | | |
|---|---|---|---|
| 3,619,581 | 11/1971 | Kimura et al. ................. | 235/151.11 |
| 3,325,630 | 6/1967 | Murakami.................. | 235/151.11 X |
| 3,634,667 | 1/1972 | Okamoto et al. ................... | 235/152 |
| 3,605,531 | 9/1971 | Izumi et al..................... | 318/572 X |

Primary Examiner—Charles E. Atkinson
Assistant Examiner—Jerry Smith
Attorney—Norman F. Oblon et al.

[57] ABSTRACT

A helical working locus caused by the co-operational movements between a tool and a workpiece is represented by a number of pairs which consist of values of accumulated unit angles and unit leads. A storage device stores the co-ordinates of $N^2$ ($N > 3$) points derived from a data source which stores input data of all of the co-ordinates representing a desired three dimension surface. A calculator sets up N functions of an angle in accordance with the co-ordinates of the $N^2$ points in order to calculate the value of each of the N functions of the angle with respect to the angle of the number of pairs. Another calculator sets up a function of a lead in accordance with the calculated values in order to calculate the radius of the point represented by the number of pairs. An interpolator distributes electric pulses to a controller of a numerically controlled machine tool which operably supports the tool and the workpiece along the point represented in three dimension by the number of pairs and the calculated radius.

3 Claims, 7 Drawing Figures

SYSTEM FOR PRODUCING A THREE DIMENSION SURFACE

BACKGROUND OF THE INVENTION

The present invention relates to systems for producing a three dimension surface which varies in either or both the radial and the axial direction on a workpiece, and more particularly to such a system which permits the production of a three dimension surface on a workpiece with increased accuracy by simultaneously controlling the co-operative movements of the three dimensions of the workpiece and a grinding wheel or a tool of the machine tool.

As an example of a three dimension surface produced by the system according to the present invention is a piston for an internal-combustion engine. The sectional profiles of the piston which are perpendicular to its axis are oval and the ellipticity of the oval of each section gradually changes in accordance with the axial position of each section. In the past, in the production of such a three dimension surface, the tool was radially moved in co-operation with the rotation of the workpiece to produce a profile of a section of the workpiece by each rotation. The axial position of the section to be machined was shifted by a unit amount each time the workpiece was rotated 360°. Thus, the three dimension surface was produced. However, while generally satisfactory, such a system causes the peripheral surface of the workpiece to receive axial tool marks. Additionally, the rotation of the workpiece had to be temporarily stopped when the working position was axially moved in order to work the following sections. Accordingly, the machining accuracy and efficiency were somewhat reduced.

SUMMARY OF THE INVENTION

It is therefore an object of the present invention to provide a new and improved system for efficiently and accurately producing an approximated three dimension surface on a workpiece by helically controlling the co-operational movements between an operative tool and a workpiece in the three dimension directions in accordance with numerical information.

It is another object of the present invention to provide a new and improved working system having a pulse distributing system for interpolating the co-ordinates of the points representing a helical working locus of the co-operational movements between an operative tool and a workpiece with reference to input data of the co-ordinates representing a desired three dimension surface.

Still another object of the present invention is to provide a new and improved working system having a device for producing a number of pairs consisting of angles and leads for co-ordinately representing the helical working locus by accumulating a unit angle and a unit lead which are predetermined with reference to the helical working locus.

Briefly, according to the present invention, these and other objects are achieved by providing a numerically controlled machine tool having at least one controller and a pulse distributing system as mentioned below. A storage device stores the co-ordinates of $N^2$ (N : a natural number more than 3) points derived from a data source which is provided for storing input data of all of the co-ordinate values representing a desired three dimension surface. Accumulating means are provided to accumulate a unit angle and a unit lead to provide a number of pairs consisting of angles and leads to co-ordinately represent a helical working locus. The unit angle is predetermined so as to divide the helical working locus at constant angular intervals. The unit lead is predetermined correspondingly to the unit angle to thereby divide the lead of the helical working locus at regular intervals. A calculator sets up N functions of an angle in accordance with the co-ordinate values of the derived $N^2$ points in order to calculate the value of each of the N functions of the angle with respect to the angle of the number of pairs. Another calculator sets up a function of a lead by the calculated values of the N functions of the angle in order to calculate the radius of a point represented by the number of pairs by substituting the lead of the number of pairs into the function of the lead. An interpolator distributes electric pulses to the controller along the point represented by the number of pairs and the calculated radius.

BRIEF DESCRIPTION OF THE DRAWINGS

The foregoing and other objects of the present invention will be more fully appreciated as the same becomes better understood from the following detailed description of a preferred embodiment when considered in connection with the accompanying Drawings, in which.

DESCRIPTION OF A PREFERRED EMBODIMENT

Figure 1:
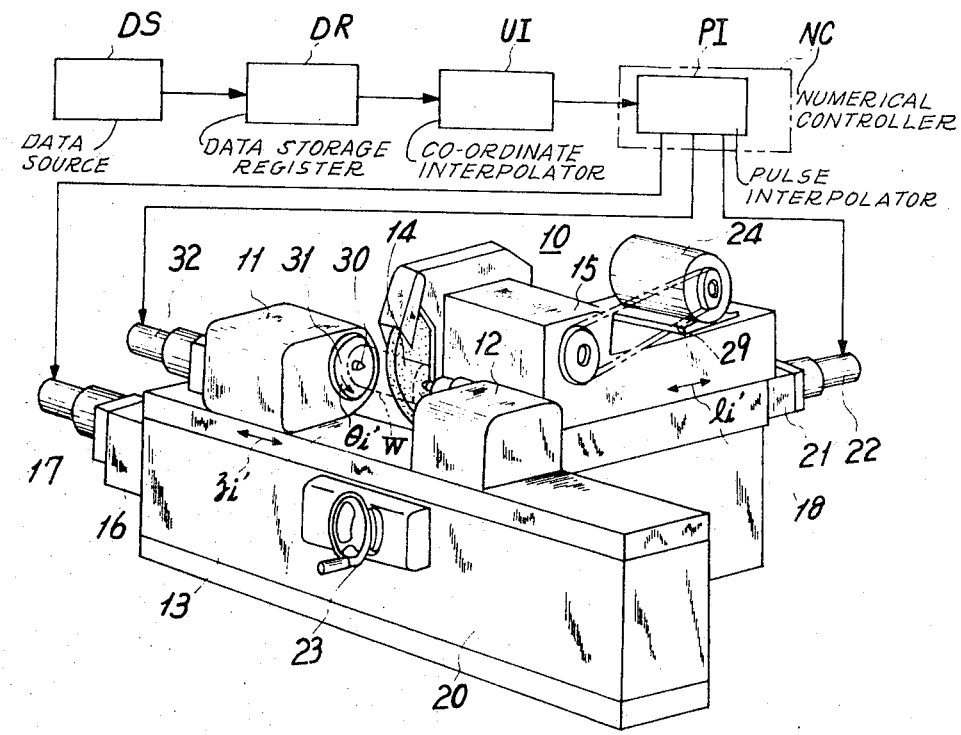
FIG. 1 is a schematic view showing a machining apparatus and a block diagram of a control therefor according to the working system of the present invention.
Figure 2:
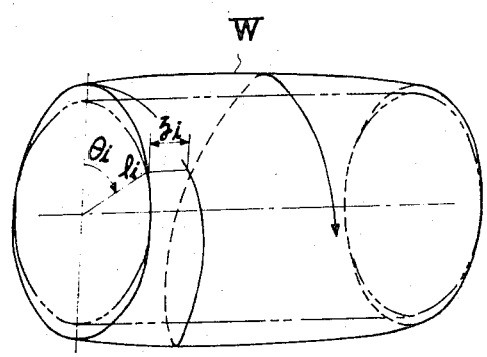
FIG. 2 is a schematic view showing the co-ordinate elements of a workpiece to be worked and a helical working locus of an operative tool.

Referring now to the Drawings, wherein like reference numerals refer to identical or corresponding parts throughout the several views, and more particularly to FIG. 1 thereof, wherein a numerically controlled grinding machine 10 is shown as being contained in the working system of the present invention. A workpiece W, shown by phantom line, is ground by a rotating grinding wheel 14 so as to have a desired three dimension surface thereon. The workpiece W is rotatably supported at center 30 between a headstock 11 and a tailstock 12 which are fixedly mounted on a work table 13. The grinding wheel 14 is rotatably mounted on a wheel head 15. A wheel slide 18 slidably mounts the wheel head 15. The work table 13 and the wheel slide 18 are slidably mounted in a well known manner on a bed so as to be in a direction perpendicular to each other. The work table 13 is threadedly engaged with a feed screw (not shown) at the nut portion downwardly projected therefrom. The end of the feed screw is drivingly connected to a servo-motor 17 through a reduction gearing 16. The servo-motor 17 rotates in response to electric pulses applied thereto. In the same manner the wheel head 15 is threadedly engaged with a feed screw which is rotated by a servo-motor 22 through a reduction gearing 21 mounted on the rear of the wheel slide 18. The wheel slide 18 is moved toward and away from the workpiece W by the rotation of another feed screw which is selectively connected through a clutch to a hand wheel 23 and an adequate power driving device (not shown), as well known to those skilled in the art. A motor 24 is mounted on the wheel head 15 to rotate the grinding wheel 14 through a belt 29. A spindle 31 is rotatably mounted in the headstock 11 for rotation by a servo-motor 32 through an adequate gearing in the headstock 11. Servo-motors 17, 22 and 32 are operated with relation to each other in accordance with control pulses transmitted from a numerical controller NC so that the peripheral surface of the workpiece W may be ground by the grinding wheel 14 along a predetermined working locus described in detail hereinafter. In such a manner, a three dimension surface which varies in either the axial or the radial direction is provided. In other words, a workpiece rotary angle $\theta i'$, a radial feed amount $li'$ of the grinding wheel 14, and a feed amount $zi'$ of the table 13 are simultaneously and continuously controlled so that the grinding point of the grinding wheel 14 may be helically moved in operating engagement with the workpiece W under a constant grinding condition, without a break, over the whole periphery of the workpiece W, as shown in FIG. 2.

Figure 3:
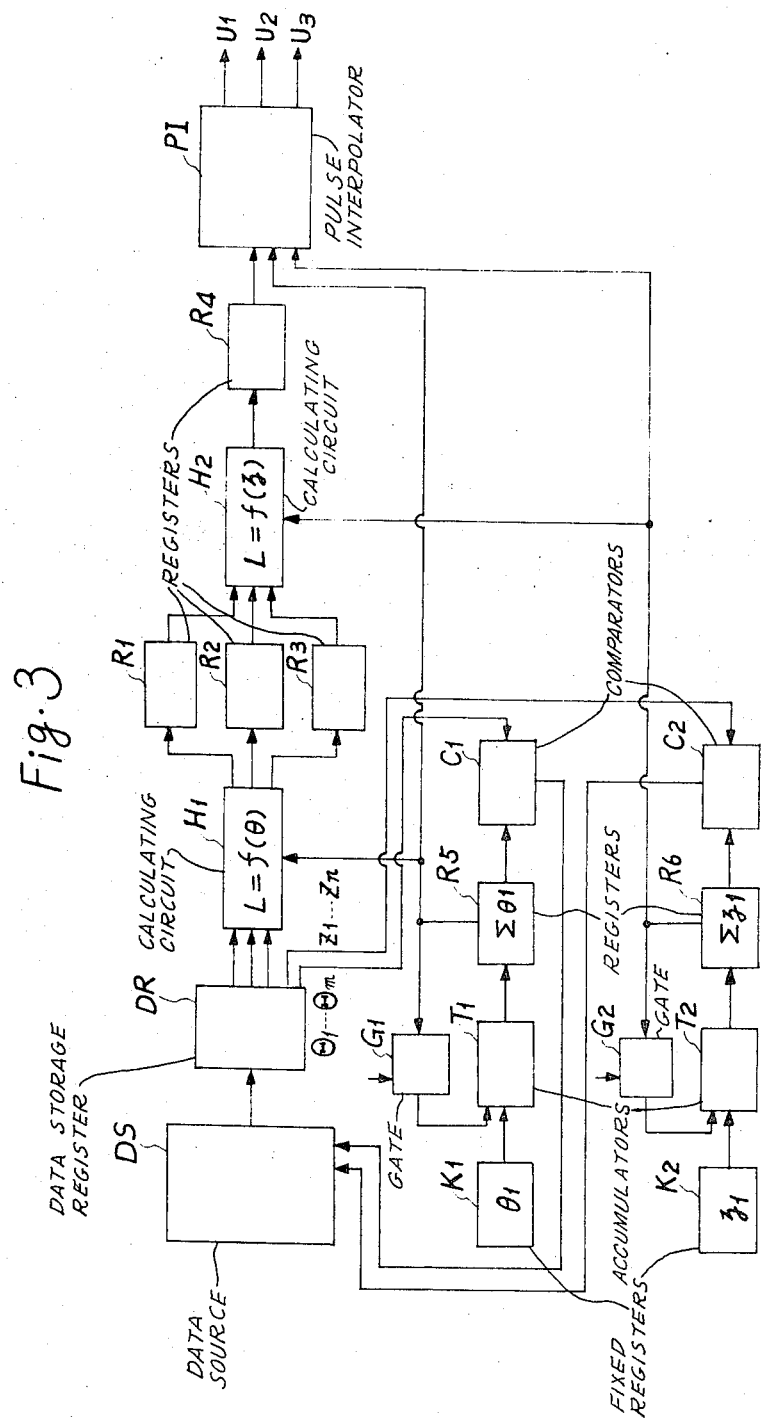
FIG. 3 shows a detailed block diagram of the control system of FIG. 1.

Referring now to FIG. 3, a detailed diagram of the control system for the present invention is shown wherein a sign $K_1$ designates a fixed register which stores an initial value $\theta_1$ of a unit angle which is defined, in a manner described in detail hereinafter, so as to divide the helical working locus at constant angular intervals. A fixed register $K_2$ stores an initial value $z_1$ of a lead which is defined, in a manner described in detail hereinafter, so as to divide the lead of the helical working locus at regular intervals corresponding to the unit angle $\theta_1$. Signs $T_1$ and $T_2$ indicate accumulators which are respectively connected to the fixed registers $K_1$ and $K_2$ for accumulating the unit angle $\theta_1$ and the unit lead $z_1$ each time gates $G_1$ and $G_2$ which are respectively connected thereto are opened. Registers $R_5$ and $R_6$ are connected to the accumulators $T_1$ and $T_2$ to store the accumulated values, which are transmitted to the accumulators $T_1$ and $T_2$ through the gates $G_1$ and $G_2$ when the gates $G_1$ and $G_2$ are opened. The registers $R_5$ and $R_6$ are reset so as to be initially held in a zero state. When the gates $G_1$ and $G_2$ are opened, the contents of the registers $R_5$ and $R_6$ are respectively changed to the states $\theta_1$ and $z_1$ during a first adding operation. During a second adding operation the contents of the registers $R_5$ and $R_6$ are respectively changed to the states $\theta_2$ and $z_2$ which are equal to $2\theta_1$ and $2z_1$. Thus, the accumulating device mentioned above is provided so as to produce a group of separate numbers, consisting of a number of pairs $(\theta_1, z_1)$, $(\theta_2, z_2)$, - - -, of angles and leads which represent the helical working locus by the points A, B, C, - - -, as shown on the Ⓗ -Z co-ordinates of FIG. 7. The co-ordinate values of the radius of the points A, B, C, - - - are calculated by calculating devices which will be described hereinafter with reference to the input data of the co-ordinates so as to represent a desired profile of the peripheral surface of the workpiece W. The exemplary workpiece shown in FIG. 2 is of a hand-drum-like shape and is to be provided with a desired profile. The sectional profiles perpendicular to the axis of the workpiece of FIG. 2 are oval. The ellipticity of the oval of each section radially changes in accordance with the axial position of each section. The workpiece W has the largest oval section on the central portion thereof.

The input data (Li, Ⓗ i, Zi) of the desired profile are preliminarily provided in a data source DS for storage on a permanent record such as a punched tape, a magnetic tape and the like. A data storage register DR is connected to the data source DS for storing the data of the co-ordinates of the three squared (nine) points, for example, the points $P_{11}$, $P_{21}$, $P_{31}$, $P_{12}$, $P_{22}$, $P_{32}$, $P_{13}$, $P_{23}$ and $P_{33}$ in FIG. 7, which are obtained from the data source DS. It should be understood that these points are positioned in the state of a lattice on the peripheral surface of the workpiece W. A calculating circuit $H_1$ is connected to the data storage register DR to set up a quadratic function of the angle $L = f(\theta)$ which represents a curve smoothly connecting the three points, for example, the points $P_{11}$, $P_{21}$ and $P_{31}$, on the Ⓗ -L co-ordinates. In the same manner, two quadratic functions of the angle are set up by the calculating circuit $H_1$ with reference to the resting points, for example, points $P_{12}$, $P_{22}$, $P_{32}$, $P_{13}$, $P_{23}$ and $P_{33}$. Registers $R_1$, $R_2$ and $R_3$ are connected to the first calculating circuit $H_1$ to store the co-ordinate values of the three points, for example, $a_1$, $b_1$ and $c_1$, shown in FIG. 7. These points include the solutions of the radius obtained by substituting the same angle of the aforementioned number of pairs into the three quadratic functions of the angle. A calculating circuit $H_2$ is connected to the registers $R_1$, $R_2$ and $R_3$ to set up a quadratic function of the lead $L = f(z)$ which represents a curve smoothly connecting the three points, for example, the points $a_1$, $b_1$ and $c_1$, which are represented by the three co-ordinates respectively having the same angle, for example, $\theta_1$. A register $R_4$ is connected to the second calculating circuit $H_2$ to store the solution of the radius obtained in the calculating circuit $H_2$ when the lead $z_1$ is substituted into the quadratic function of the lead.

A comparator $C_1$ is connected to the data storage register DR and the register $R_5$ to compare the input angle data Ⓗ $i$ with the accumulated value of the unit angle $\theta_1$, to thereby enable discrimination of a large or small difference therebetween. A comparator $C_2$ is connected to the data storage register DR and the register $R_6$ to compare the input lead data Zi with the accumulated value of the unit lead $z_1$, to thereby enable discrimination of a large or small difference therebetween. The comparators $C_1$ and $C_2$ are further connected to the data source DS in order to transmit new profile data to the data storage register DR when the next point to be interpolated is out of a given reference region defined by the derived points mentioned above and as described hereinafter. A conventional co-ordinate interpolator UI, FIG. 1, is provided for selectively reading out only the data necessary to interpolate the co-ordinates of the helical working locus as shown in FIG. 2 in the manner described above. The co-ordinate values of each point given by the interpolator UI are transmitted as a start and a terminal point of the moving locus of the tool to the numerical controller NC which has a conventional pulse interpolator PI therein. The pulse interpolator PI is connected to the registers $R_4$, $R_5$, and $R_6$ to change the values of the co-ordinates of the points A, B, C, - - - on the helical working locus into pulse representation numbers thereof by counting fractions of 0.5 and over as a whole number and disregarding any remainders. The pulse interpolator PI distributes electric pulses to interpolate the space between the start and the terminal points.

a. Before the three dimension surface on the workpiece can be produced, the peripheral end of the grinding wheel 14 is formed to a round shape by a suitable dressing device. The radius of the round shape must be determined so that a profile error effected thereby may be within an allowable tolerance.

Figure 4:
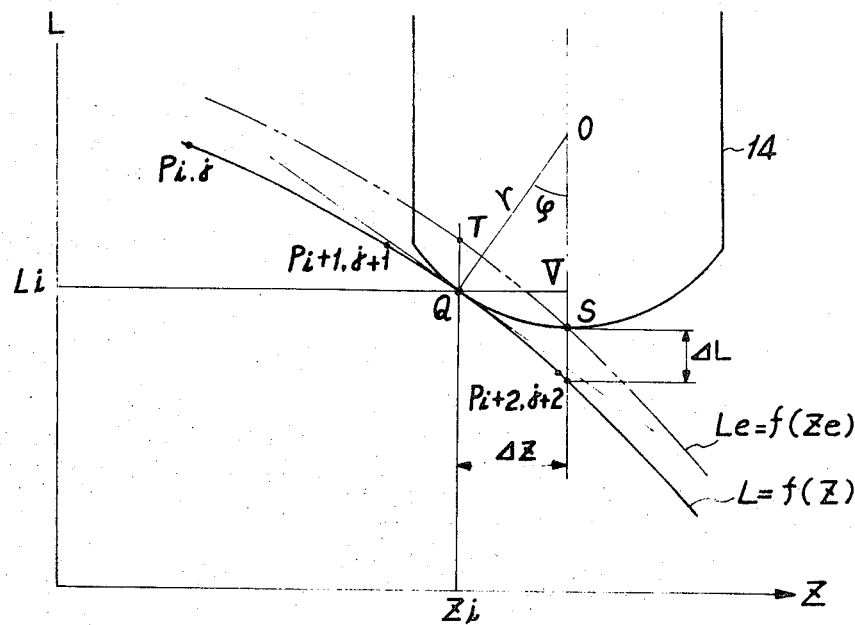
FIGS. 4 and 5 are schematic views for respectively explaining how to select the lead and the radius of the peripheral end of a grinding wheel.

Referring now to FIG. 4, wherein the radius $r$ of the round shape is shown, the error $\Delta Z$ of the Z-axis and the error $\Delta L$ of the L-axis are represented as follows:

at an ordinary point Q($L_i$, $Z_i$) on the curve $L=f(Z)$
$\tan \phi = f'(Z_i)$
so $\phi = \tan^{-1} f'(Z_i)$
in right-angled-triangle OVQ
$\Delta Z = \overline{QV} = r \sin \phi$
$L = L_i - f(Z_i + \Delta Z) - \overline{VS}$
$\overline{VS} = \overline{OS} - \overline{OV} = r - r\cos \phi = r(1-\cos\phi)$
so $L = L_i - f(Z_i + \Delta Z) - r(1-\cos\phi)$    (1)

Where $\phi$ = gradient of the tangent of the point Q or the angle determined by the lines $\overline{OQ}$ and $\overline{OS}$;
$L=f(Z)$ is a quadratic function set up by the three adjacent points $P_{i,j}$, $P_{i+1,j+1}$, and $P_{i+2,j+2}$.

The error $\Delta L$ indicates an approximate error of the L-axis between the locus $L=f(Z)$ of the actual grinding point Q and a locus $L_e=f(Z_e)$ of the programmed grinding point S. Hereinafter, it is assumed that the error $\Delta L$ is approximately equal to $\overline{TQ}$. In the selection of the radius $r$ so as to set the error $\Delta L$ below a predetermined allowable tolerance, a radius $r_o$ satisfying the condition of $\Delta L = \epsilon$ is utilized and the equation (1) becomes the following equation:
$\epsilon = L_i - f(Z_i + \Delta Z) - r_o(1 - \cos\phi)$
where $\epsilon$ designates a predetermined value within the allowable tolerance.

Figure 5:
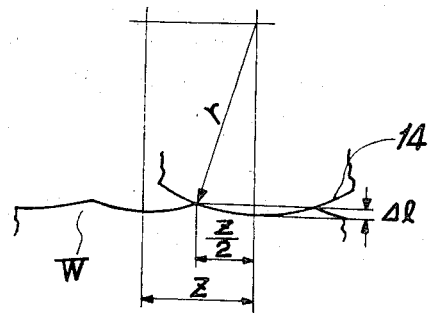

From FIG. 4 it should be understood that the smaller the radius $r$, the smaller is the errors $\Delta Z$ and $\Delta L$ of the profile. Therefore, the radius $r$ is set to be smaller in size than $r_o$. However, by using a small $r$, the radial error $\Delta 1$ will be large when the lead Z of the helical locus of grinding is constant, as shown in FIG. 5. In order to reduce the error $\Delta 1$ to less than an allowable value, the lead Z must be defined small to thereby necessarily bring about the increase of the input data for the production of the three dimension surface and the reduction of machining efficiency. Accordingly, the value of radius $r$ will be selected less than and close the the radius $r_o$.

b. In order to decide the lead Z of the Z-axis based on the selected radius $r$, the radial error $\Delta 1$ is represented as follows referring to FIG. 5:
$\Delta 1 = r - \sqrt{r^2 - (Z/2)^2}$    (2)

In the selection of the lead Z to make the radial error $\Delta 1$ less than an allowable tolerance $\delta$, if a lead value $Z_o$ satisfying the condition $\Delta 1 = \delta$ is utilized, then the equation (2) is changed as follows:
$\delta = r - \sqrt{r^2 - (Z_o/2)^2}$
Therefore, although the lead Z may be set to a value smaller in size than that of the lead $Z_o$, it is desirable to set the same as close to the $Z_o$ value as possible in consideration of the increase of input data and the machining efficiency as mentioned above.

c. Next, a dividing rotary or unit angle of the workpiece must be decided so that the profile error of each section perpendicular to the workpiece axis may become less than an allowable tolerance. In this case, it must be noted that the profile accuracy of each section is affected by the radius of the grinding wheel 14. The affection of the radius may be substantially disregarded because of a small amount of offset of the cutter diameter when a workpiece close to true circulars and having a small ellipticity or a small cam lift amount is ground to a three dimension surface. However, it cannot be disregarded in the case of a workpiece having a large ellipticity or a large cam lift amount. In this case, the input data is amended to compensate for the error caused by the amount of offset of the cutter diameter. The unit angle is decided in accordance with an amended input data as described below. The amended data $\theta$ and $l$ are represented as follows:
$\theta = Ⓗ + \tan^{-1}(L'/R+L)$
$l = \sqrt{(R+L)^2 + (L')^2} - R$
where R = radius of the grinding wheel; Ⓗ = workpiece rotary angle not amended; $L'$ = differentiation of L with respect to Ⓗ.

A detailed description of the aforementioned formulas need not be given since such formulas are well known to those skilled in the art (see United States Pat. No. 3,619,581, assignor to Toyoda Koki Kabushiki Kaisha and Kabushiki Kaisha Toyota Chuo Kenkyusho).

Figure 6:
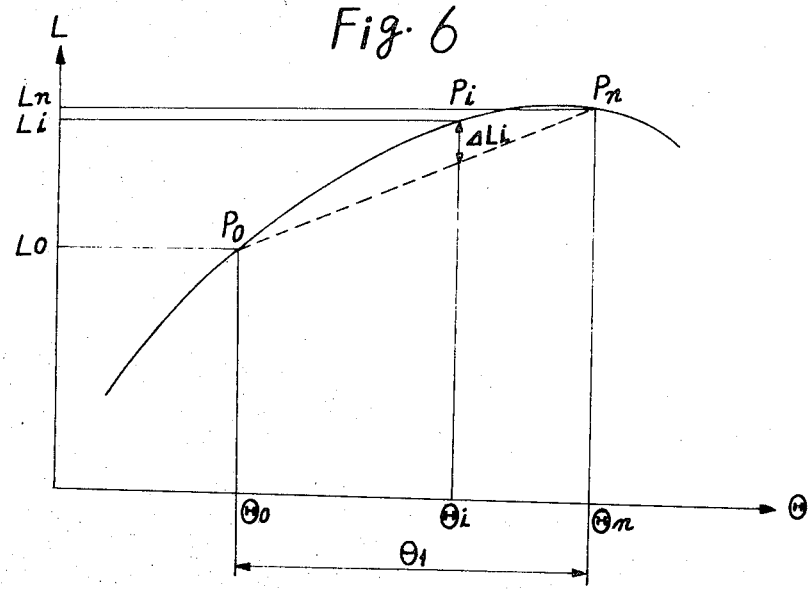
FIG. 6 is a graph for explaining how to select a dividing angle segment of a unit angle $\theta_1$; and, FIG. 7 is a schematic view fragmentally showing a three dimension surface to be produced on a workpiece and the operational principles for interpolating the co-ordinates of the points on a helical working locus.

Hereinafter, a manner is described for checking for error in the selection of the unit angle. In case the unit angle makes an angle of $\theta_1$ (360° is exactly divisible by $\theta_1$) a lift curve designated as a part of the oval line in FIG. 6 is approximated by a straight line segment $\overline{P_o P_n}$. The profile curve of the workpiece produced by grinding is represented as a curve close to the "Arukimedesu curve" because the $\theta$ is rendered as a rotary angle in the grinding operation. The equation of the straight line segment $\overline{P_o P_n}$ is represented as follows:
$L = (L_n - L_o / Ⓗ_n - Ⓗ_o)(Ⓗ - Ⓗ_o) + L_o$    (3)

When $P_i$ is represented by the straight line of equation (3), an error $\Delta L_i$ is represented as follows:
$\Delta L_i = (L_n - L_o / Ⓗ_n - Ⓗ_o)(Ⓗ_i - Ⓗ_o) + L_o - L_i$
when all points $P_o + 1$ to $P_n - 1$, inclusive, satisfy the following condition:
$-y \leq \Delta L_i \leq Y$    (4)

where the $y$ designates an allowable tolerance, then each point existing from $P_o$ to $P_n$ can be approximated by the equation (3). When the unit angle $\theta_1$ (equal to $Ⓗ_n - Ⓗ_o$) which satisfies the equation (4) includes the abscissa of a portion wherein the lift curve takes the largest curvature thereof, then the error caused by the linear approximation with the lift curve is within the allowable tolerance with respect to each angular portion which is divided into equal portions with the unit angle $\theta_1$. The lift curve is approximated by straight line segments which connect the points by which the lift curve is divided at regular intervals of the unit angle $\theta_1$. The aforementioned check operation for error is performed about each different ellipticity. The number of dividing points to be interpolated may be reduced by taking a larger dividing angle with respect to a portion having a small ellipticity.

After the radius $r$ of the round portion of the grinding wheel 14, the lead Z of the helical locus and the unit angle $\theta_1$ are decided as mentioned above, a co-ordinates interpolation of interpolating points A, B, C, - - - to control the relative displacement of the tool along the helical locus is performed as follows:

I. Interpolation of the point A (Referring to FIG. 7)

1. A quadratic function $L = f_1(\theta)$ smoothly connecting points $P_{11}$, $P_{21}$ and $P_{31}$ is set up by the co-ordinate values of the points $P_{11}$, $P_{21}$ and $P_{31}$.

2. The co-ordinate value of the point $a_1$ is set up by substituting $\theta_1$ into the function $L=f_1(\theta)$.

3. A quadratic function $L=f_2(\theta)$ smoothly connecting points $P_{12}$, $P_{22}$ and $P_{32}$ is set up by the co-ordinate values of the points $P_{12}$, $P_{22}$ and $P_{32}$.

4. The co-ordinate value of the point $b_1$ is set up by substituting $\theta_1$ into the function $L=f_2(\theta)$.

5. A quadratic function $L=f_3(\theta)$ smoothly connecting points $P_{13}$, $P_{23}$ and $P_{33}$ is set up by the co-ordinate values of the points $P_{13}$, $P_{23}$ and $P_{33}$.

6. The co-ordinate value of the point $c_1$ is set up by substituting $\theta_1$ into the function $L=f_3(\theta)$.

7. A quadratic function $L=f_{10}(Z)$ smoothly connecting points $a_1$, $b_1$ and $c_1$ is set up by the co-ordinate values of the points $a_1$, $b_1$ and $c_1$.

8. A lead $z_1$ per the dividing angle $\theta_1$ is represented as follows:

$$z_1 = Z/360 \times \theta_1$$

9. The co-ordinate value $1_1$ of point A is set up by substituting $z_1$ into the function $L=f_{10}(Z)$. The co-ordinate value $1_1$ of the point A is changed to a pulse representation number $1_1'$ therefore by counting fractions of 0.5 and over as a whole number and disregarding the remainder. In the same manner the angle $\theta_1$ and the lead $z_1$ are changed to their pulse representation numbers $\theta_1'$ and $z_1'$, respectively. Thus, the co-ordinates of the pulse representation numbers $\theta_1'$, $1_1'$ and $z_1'$ of the point A are set up.

The aforementioned procedure is described in detail hereinafter with reference to the block diagram of FIG. 3. The data source DS stores the co-ordinates of all of the points ($P_{11}$, $P_{21}$, - - - $P_{m1}$, $P_{12}$, $P_{22}$, - - - $P_{m2}$, - - -, $P_{1n}$ - - - Pmn) of the peripheral surface of the workpiece W. The data of the points $P_{11}$, $P_{21}$, $P_{31}$, $P_{12}$, $P_{22}$, $P_{32}$, $P_{13}$, $P_{23}$ and $P_{33}$ which is necessary to interpolate the point A is applied from the data source DS to the data storage register DR and is stored in the data storage register DR. The co-ordinate values of the points $P_{11}$, $P_{21}$ and $P_{31}$ are first transmitted to the calculating circuit $H_1$ wherein the quadratic function $L=f_1(\theta)$ is set up. The value of $\theta_1$ set up by the first calculation of the accumulator $T_1$ is shifted to be stored in the register $R_5$, and is substituted into the quadratic function $L=f_1(\theta)$. The solution (the co-ordinate value of the point $a_1$) of the function $L=f_1(\theta)$ is stored in the register $R_1$. Next, the co-ordinate values of the points $P_{12}$, $P_{22}$ and $P_{32}$ are transmitted to the calculating circuit $H_1$ wherein the quadratic function $L=f_2(\theta)$ is set up. The value of $\theta_1$ which is transmitted from the register $R_5$ is substituted into the quadratic function $L=f_2(\theta)$ and the solution thereof (the co-ordinate value of the point $b_1$) is transmitted to and stored in the register $R_2$. Furthermore, the co-ordinate values of the points $P_{13}$, $P_{23}$ and $P_{33}$ are applied to the calculating circuit $H_1$ wherein the quadratic function $L=f_3(\theta)$ is set up. The value of $\theta_1$ is substituted into the function $L=f_3(\theta)$. The solution (the co-ordinate value of the point $c_1$) of the function $L=f_3(\theta)$ is transmitted to and stored in the register $R_3$. The values of the registers, $R_1$, $R_2$ and $R_3$ are transmitted to the calculating circuit $H_2$ wherein a quadratic function $L=f_{10}(Z)$ for smoothly connecting the three points $a_1$, $b_1$ and $c_1$ is set up. The value of $z_1$ which is stored in the register $R_6$ by the first addition of the accumulator $T_2$ is substituted into the quadratic function $L=f_{10}(Z)$. The solution $1_1$ (the co-ordinate value of the point A) of the function $L=f_{10}(Z)$ is transmitted to and stored in the register $R_4$. The value of $1_1$ is also transmitted to the pulse interpolator PI together with the values of $\theta_1$ and $z_1$ which are respectively stored in the registers $R_5$ and $R_6$. The values of $1_1$, $\theta$ and $z_1$ are changed to pulse representation numbers by counting fractions of 0.5 and over as a whole number and disregarding the remainder in the pulse interpolator PI. The pulse interpolation of the straight line segment having the start point $P_{11}$ and the terminal point A is then performed to thereby generate pulse signals which are simultaneously distributed to the output terminals $U_1$, $U_2$ and $U_3$ of the pulse interpolator which correspond to the three axes. The pulse signals are transmitted to each of the servo-motors 17, 22 and 32 in order to simultaneously control the rotation of the workpiece W, the transverse feed of the grinding wheel 14, and the traverse feed of the workpiece W. Thus, a three dimension surface is formed on the workpiece W. Moreover, although the quadratic function is used as an equation for smoothly connecting the three points, an equation of a higher degree, such as the third or the fourth degree may be used as a function of the curve for smoothly connecting four points and over.

II. Interpolation of the point B.

Figure 7:
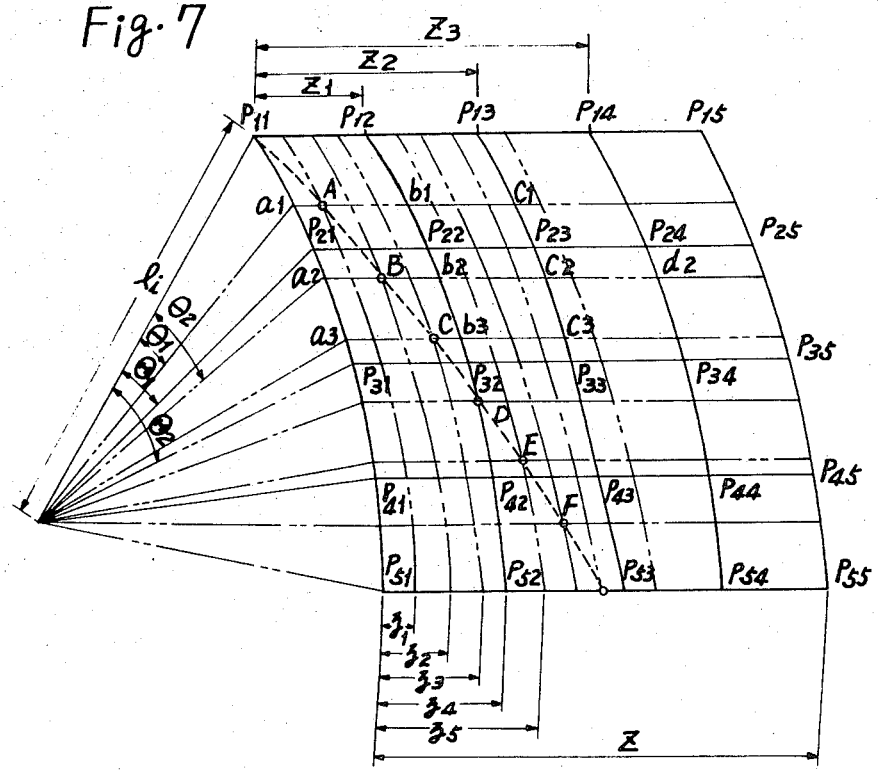

The operation to set up the co-ordinate value of the point B is performed in nearly the same manner as that of setting up the point A. Since the position of the point B is out of the region surrounded by the points $P_{11}$, $P_{21}$, $P_{22}$ and $P_{12}$, as shown in FIG. 7, the co-ordinates interpolation of the point B is performed on the basis of the curved surface defined by the points $P_{21}$, $P_{41}$, $P_{43}$ and $P_{23}$ so as to provide a higher accuracy. Therefore, a discrimination as described below is performed to change the reference curved surface for the co-ordinates interpolation.

First of all, the sizes of $\theta_2$ and $Ⓗ_1$ and of $z_1$ and $Z_1$ are respectively compared by the individual comparators $C_1$ and $C_2$ of FIG. 3, to discriminate whether the next point B is in or out of the region surrounded by the points $P_{11}$, $P_{21}$, $P_{22}$ and $P_{12}$. When gates $G_1$ and $G_2$ are opened by the completion of the pulse distribution of the point A, a second addition is performed by the adders $T_1$ and $T_2$ to thereby change the $\theta_1$ to $\theta_2$ (equal to $2\theta_1$) and the $z_1$ to $z_2$ (equal to $2z_1$). The values of $\theta_2$ and $z_2$ are stored in the registers $R_5$ and $R_6$ and are respectively applied to the input terminals of the comparators $C_1$ and $C_2$. The other input terminals of the comparators $C_1$ and $C_2$ have respectively applied thereto the angle $Ⓗ_1$ and the lead $Z_1$ by the data storage register DR. As a result of the comparison, when the values of $\theta_2$ and $z_2$ are larger than those of $Ⓗ_1$ and $Z_1$, new data is transmitted from the data source DS to the data storage register DR to change the reference curved surface. On the other hand, when the values of $\theta_2$ and $z_2$ are smaller than those of $Ⓗ_1$ and $Z_1$, new data is not transmitted to the data storage register DR because the first reference curved surface is also useable with respect to the point B.

As a result of the comparison, four cases are considered as follows:

1. in case $\theta_2 < Ⓗ_1, z_2 < Z_1$ (1-1) The co-ordinates of the points $a_2$, $b_2$ and $c_2$ are set up by substituting the $\theta_2$ into the equations $L=f_1(\theta)$, $L=f_2(\theta)$ and $L=f_3(\theta)$.

(1-2) A function $L=f_{20}(Z)$ is set up by the points $a_2$, $b_2$ and $c_2$.

(1-3) A co-ordinate value $l_2$ is set up by substituting the $z_2$ into the function $L=f_{20}(Z)$.

The co-ordinate value $l_2$ of the point B is changed to a pulse representation number $l_2'$ by counting fractions of 0.5 and over as a whole number and disregarding the remainder. In the same manner, the angle $\theta_2$ and the lead $z_2$ are changed to their pulse representation numbers $\theta_2'$ and $z_2'$, respectively. Thus, the co-ordinates of the pulse representation numbers $\theta_2'$, $l_2'$ and $z_2'$ of the point B are set up.

2. in case $\theta_2 \geq Ⓗ_1, z_2 < Z_1$ (2-1) Quadratic functions $L=f_{11}(\theta)$, $L=f_{12}(\theta)$ and $L=f_{13}(\theta)$ are set up by the points $P_{21}$, $P_{31}$ and $P_{41}$, the points $P_{22}$, $P_{32}$ and $P_{42}$, and the points $P_{23}$, $P_{33}$ and $P_{43}$, respectively.

(2-2) The co-ordinates of the points $a_2$, $b_2$ and $c_2$ are set up by substituting the $\theta_2$ into the functions $L=f_{11}(\theta)$, $L=f_{12}(\theta)$ and $L=f_{13}(\theta)$, respectively.

(2-3) A function $L=f_{20}(Z)$ is set up by the points $a_2$, $b_2$ and $c_2$.

(2-4) The co-ordinate value $l_2$ of the point B is set up by substituting the $z_2$ into the function $L=f_{20}(Z)$. The co-ordinate value $l_2$ is changed to a pulse representation number $l_2'$ by counting fractions of 0.5 and over as a whole number and disregarding the remainder. In the same manner, pulse representation numbers $\theta_2'$ and $z_2'$ are represented with respect to the $\theta_2$ and the $z_2$, respectively. Thus, the co-ordinates of the pulse representation numbers $\theta_2'$, $l_2'$ and $z_2'$ of the point B are set up.

3. in case $\theta_2 < Ⓗ_1, z_2 \geq Z_1$ (3-1) A quadratic function $L=f_4(\theta)$ is set up by the points $P_{14}$, $P_{24}$ and $P_{34}$.

(3-2) The co-ordinates of the points $b_2$, $c_2$ and $d_2$ are set up by substituting the $\theta_2$ into the functions $L=f_2(\theta)$, $L=f_3(\theta)$, and $L=f_4(\theta)$.

(3-3) A function $L=f_{21}(Z)$ is set up by the points $b_2$, $c_2$ and $d_2$.

(3-4) The co-ordinate value $l_2$ of the point B is set up by substituting the $z_2$ into the function $L=f_{21}(Z)$. The co-ordinate value $l_2$ is changed to a pulse representation number $l_2'$ by counting fractions of 0.5 and over as a whole number and disregarding the remainder. In the same manner, the angle $\theta_2$ and the lead $z_2$ are changed to their pulse representation numbers $\theta_2'$ and $z_2'$, respectively. Thus, the co-ordinates of the pulse representation numbers $\theta_2'$, $l_2'$ and $z_2'$ of the point B are set up.

4. in case $\theta_2 > Ⓗ_1, z_2 > Z_1$ (4-1) Quadratic functions $L=f_{12}(\theta)$, $L=f_{13}(\theta)$ and $L=f_{14}(\theta)$ are set up by the points $P_{22}$, $P_{32}$ and $P_{42}$, the points $P_{23}$, $P_{33}$ and $P_{43}$, and the points $P_{24}$, $P_{34}$ and $P_{44}$, respectively.

(4-2) The co-ordinates of the points $b_2$, $c_2$ and $d_2$ are set up by substituting the $\theta_2$ into the functions $L=f_{12}(\theta)$, $L=f_{13}(\theta)$, and $L=f_{14}(\theta)$.

(4-3) A quadratic function $L=f_{22}(Z)$ is set up by the points $b_2$, $c_2$ and $d_2$.

(4-4) The co-ordinate value $l_2$ of the point B is set up by substituting the $z_2$ into the function $L=f_{22}(Z)$. The co-ordinates of the pulse representation numbers $\theta_2'$, $l_2'$ and $z_2'$ of the point B are set up by counting fractions of 0.5 and over as a whole number and disregarding the remainder with respect to the co-ordinate values $\theta_2$, $l_2$ and $z_2$.

As mentioned hereinbefore, the reference curved surfaces are changed in accordance with the result of the discrimination performed by the comparators $C_1$ and $C_2$.

The co-ordinates interpolation of the point B shown in FIG. 7 is performed in the procedural order of (2-1), (2-2), (2-3) and (2-4). The pulse interpolation having a start point A and a terminal point B is performed by the pulse interpolator PI.

III. Interpolation of the point C

The sizes of $\theta_3$ (equal to $3\theta_1$) and $Ⓗ_2$ and of $z_3$ (equal to $3z_1$) and $Z_1$ are respectively compared by the individual comparators $C_1$ and $C_2$ to discriminate whether the point C is in or out of the region surrounded by the predetermined points $P_{21}$, $P_{22}$, $P_{31}$ and $P_{32}$. When the point C is out of the region, the region is shifted in the direction of $\theta$ or Z so as to contain the point C therein. Next, new quadratic functions which smoothly connect the three points are set up by the three points relating to the shifted region. Thus, it is necessary that the co-ordinates interpolation of the point C be performed. When the position of the point C is in the same region with point B as shown in FIG. 7, the procedure of the point C is as follows:

1. The co-ordinates of the points $a_3$, $b_3$ and $c_3$ are set up by substituting the $\theta_3$ into the function $L=f_{11}(\theta)$, $L=f_{12}(\theta)$ and $L=f_{13}(\theta)$, respectively.

2. An equation $L=f_{30}(Z)$ is set up by the points $a_3$, $b_3$ and $c_3$.

3. The co-ordinate value $l_3$ of the point $c_3$ is set up by substituting the $z_3$ into the function $L=f_{30}(Z)$. The fractions of $\theta_3$, $l_3$ and $z_3$ are arranged to be changed to the co-ordinate values $\theta_3'$, $l_3'$ and $z_3'$ available in pulse control systems.

IV Interpolation of the point D

Since the point D is out of the region which includes the points B and C therein, the region is shifted in the direction of $\theta$ and Z so as to include the point D therein, and in turn quadratic functions which smoothly connect the three points are set up. The co-ordinates of the point D are interpolated in accordance with the same manner as with the points A, B and C.

Other co-ordinates interpolations of the points E, F, - - - are performed in the same manner as mentioned above. The co-ordinate values of each point set up are applied to the pulse interpolator PI. Thus, the motions of the aforementioned machining devices are co-operatively controlled in accordance with the given data of the profile to thereby produce the desired three dimension surface on the workpiece.

According to the aforementioned machining system, the points on the operating locus of the tool are helically interpolated by an arbitrary interval density with reference to the data of the three dimension surface which are given in the form of a group of separate numbers of workpiece rotary angle $Ⓗ$, lift $l$ and lead $z$. As a result, enough machining accuracy can be obtained even if the density of a given profile data is not high. Moreover, the lead, the divided angle and the radius of the peripheral end of the grinding wheel, which decide the moving locus of the tool, are set up so that any error caused thereby may be below an allowable tolerance. Since the aforementioned co-ordinates interpolations are performed in accordance with the decided lead, dividing angle and radius to thereby control the machining devices, the three dimension surface is formed on the workpiece in a desired allowable tolerance.

The calculating and controlling system are made relatively simple because the radius of the peripheral end and the amount of offset of the tool or the like may be disregarded. Since the three dimension surface is formed by the tool which moves, without any interruption or break, along the helical locus, the machining efficiency is raised and tool marks are prevented.

Although certain specific embodiments of the invention have been shown and described, it is obvious that many modifications and variations thereof are possible in light of the above teachings. It is to be understood, therefore, that within the scope of the appended claims, the invention may be practiced otherwise than as specifically described herein.

What is claimed as new and desired to be secured by Letters Patent of the United States is:

1. In a numerically controlled machine tool having at least one controller and a pulse distributing system for generating an approximate three dimension surface on a workpiece by controlling the cooperational movements of the workpiece and an operative tool in response to input data, the improvement in said pulse distributing system comprising:

means for storing said input data of all co-ordinates of points representing said three dimension surface;

storage means for storing the data of co-ordinates of $N^2$ ($N \geq 3$) points derived from said input data, said $N^2$ points defining a region;

accumulator means for producing a number of pairs each consisting of an angle and a lead by accumulating a unit angle and a unit lead corresponding to said unit angle in order to represent a predetermined helical working locus, said unit angle and said unit lead being predetermined so that a profile error effected thereby may be within an allowable tolerance;

first calculating means connected to said storage means for setting up a function of an angle $L=f(\theta)$ by the co-ordinates of the three points in said region on the $\theta$-L co-ordinates in order to calculate the value of said function of the angle with respect to the angle of said number of pairs, said function representing a curve smoothly connecting said three points;

register means for storing at least the three values calculated in said first calculating means with respect to the angle of said number of pairs;

said calculating means being connected to said accumulator means and said register means for setting up a function of a lead $L=f(z)$ on the Z-L co-ordinates in accordance with said three calculated values in order to calculate the radius of a point represented by said number of pairs by substituting the lead corresponding to the angle of said number of pairs into said function of the lead; and interpolating means connected to said accumulator means and said second calculating means for distributing electric pulses to at least one controller of said machine tool along said point represented by said number of pairs and said calculated radius.

2. A numerically controlled machine tool as recited in claim 1, in which said accumulator means comprises:

a first accumulating means for accumulating said unit angle predetermined so as to divide said predetermined helical working locus at constant angular intervals in order to produce the co-ordinates of an angle of said point; and a second accumulating means for accumulating said unit lead corresponding to said unit angle in order to produce the co-ordinates of a lead of said point for dividing the lead of said predetermined helical working locus at regular intervals.

3. A numerically controlled machine tool as recited in claim 1, which further comprises comparing means connected to said accumulator means and said storage means for discriminating whether said point is in or out of said region defined by the co-ordinates of said $N^2$ points.

* * * * *